No. 694,701. Patented Mar. 4, 1902.
E. D. & O. V. VANTYLE.
ANIMAL TRAP.
(Application filed Oct. 31, 1901.)
(No Model.)
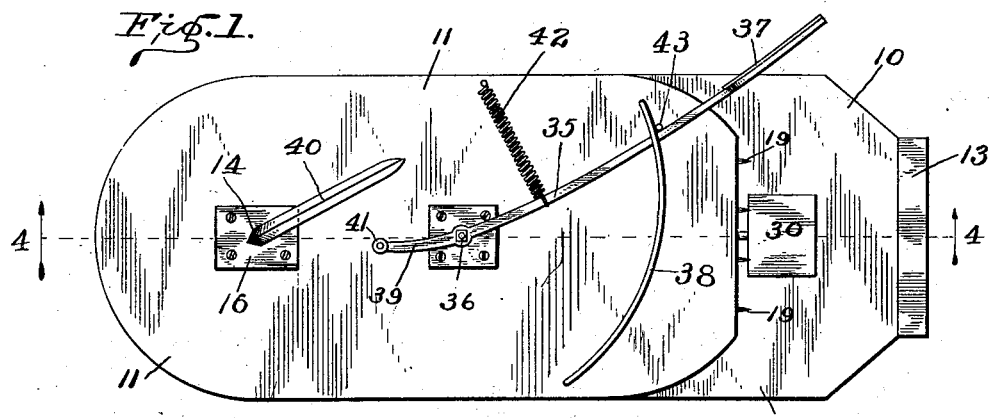
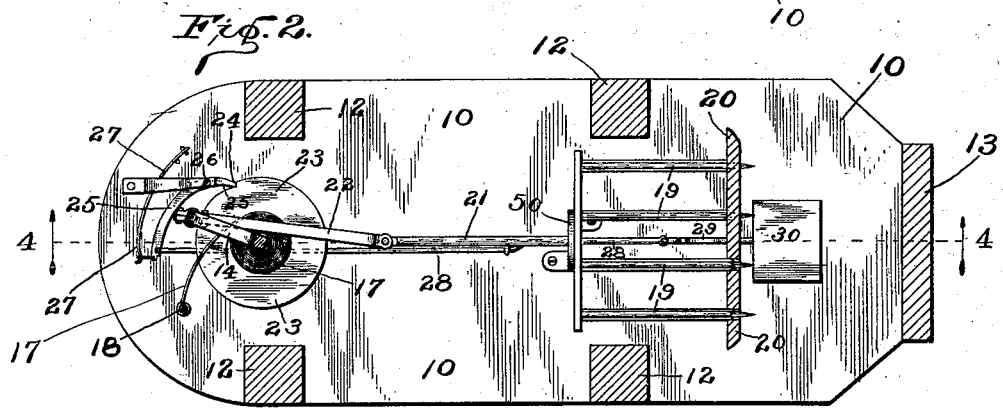
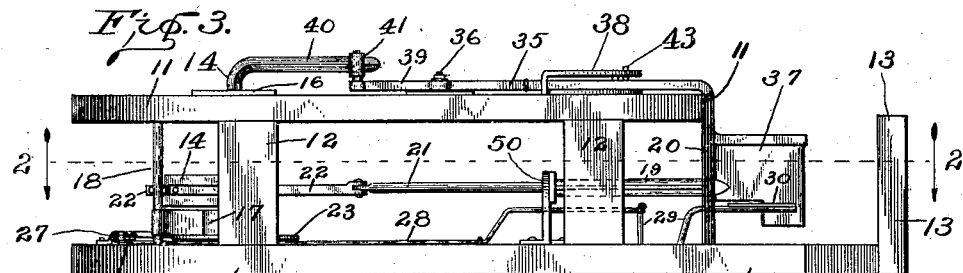
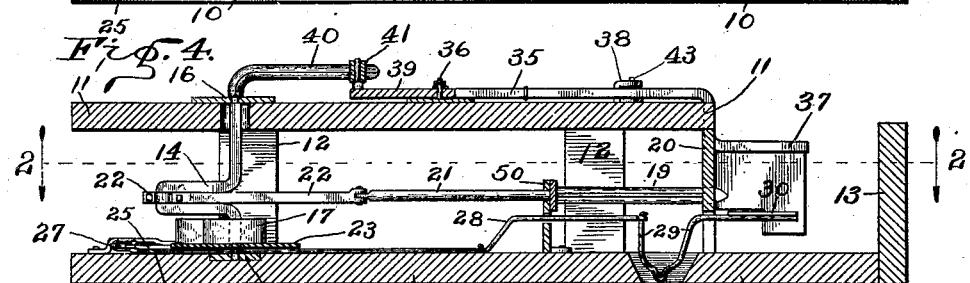
WITNESSES:
C. S. Frye.
A. J. Gearing.
INVENTORS.
Ebner D. Vantyle
and Omer V. Vantyle,
BY Chester Bradford.
ATTORNEY.

UNITED STATES PATENT OFFICE.

ELMER D. VANTYLE AND OMER V. VANTYLE, OF LEBANON, INDIANA.

ANIMAL-TRAP.

SPECIFICATION forming part of Letters Patent No. 694,701, dated March 4, 1902.

Application filed October 31, 1901. Serial No. 80,582. (No model.)

*To all whom it may concern:*

Be it known that we, ELMER D. VANTYLE and OMER V. VANTYLE, citizens of the United States, residing at Lebanon, in the county of Boone and State of Indiana, have invented certain new and useful Improvements in Animal-Traps, of which the following is a specification.

Our said invention relates to that class of devices for trapping small animals and vermin—such as rats, gophers, and the like—which operate by impaling such creatures on knives or prongs, and thus killing them as the trap is sprung.

A trap embodying said invention will be first fully described, and the novel features then pointed out in the claims.

Referring to the accompanying drawings, which are made a part hereof and on which similar reference characters indicate similar parts, Figure 1 is a top or plan view of a trap embodying our said invention; Fig. 2, a horizontal sectional view thereof as seen when looking downwardly from the dotted lines 2 2 in Figs. 3 and 4, showing the principal part of the mechanism of the trap in plan; Fig. 3, a side elevation thereof, and Fig. 4 a central vertical sectional view as seen when looking in the direction indicated by the arrows from the dotted lines 4 4 in Figs. 1 and 2.

The frame of this trap consists of suitable lower and upper plates 10 and 11, connected by appropriate standards 12, and a guard plate or wall 13, extending up from the front end of the lower plate 10. At the rear end of the trap is a crank-shaft 14, mounted in suitable bearings 15 and 16, carried by the plates 10 and 11. A strong coiled spring 17 is connected at one end to this crank-shaft and at the other end to a suitable pin 18, carried rigidly by the frame. Said spring is wound up by turning the shaft, as will be presently described, and (when wound up) furnishes the motive power for operating the mechanism of the trap. The impaling spears or knives 19 reciprocate in suitable bearings in a support 20, being mounted on a piston-rod 21 and connected to the crank-shaft 14 by a connecting-rod 22. The piston-rod runs in a bearing in a suitable support 50.

Mounted on the lower end of the shaft 14 is a disk 23, substantially circular in shape, but cut away enough at one side to form a single detent 24. A pawl 25, mounted on a pivot 26 on the frame, is adapted to engage with this detent and is normally held into engagement therewith by a suitable spring 27. A connecting-rod 28 runs forward from the outer end of the pawl 25 and connects with the bell-crank lever 29, one arm of which terminates in or supports a bait-carrying point or platform 30, which is situated in the path provided for the passage of the animals between the points of the impaling knives or spears and the guard-plate 13. The operation is: when the animal passes through this space and attempts to remove the bait in the trap that the pawl will be disengaged from the detent plate or disk 23, whereupon the spring 17 will revolve the crank-shaft 14 and drive the knives or spears 19 forward, impaling and killing the animal, which is preventing from moving or being thrown out of range by the guard-plate 13. The shaft makes a complete revolution, and the knives or spears are thus drawn back to their primary position, while the pawl reëngages (at the end of the single revolution) with the detent.

A sweep 35 is carried by a pivot 36 on the framework, and its operative end 37 is adapted to pass back and forth through the space in front of the impaling knives or spears, being preferably kept from vertical movement by a guide 38. Its lever or operating end 39 extends up vertically in the path of an arm 40 on the upper end of the main shaft 14, and said operating end is preferably provided with an antifriction-roller 41. The sweep 35 (as a whole) is held to the limit of its movement in one direction by the spring 42 against a stop 43, except when forcibly driven away from that position, which it is by the arm 40 at the times when the shaft 14 revolves. The sweep at such times is driven to the other limit of its movement, and then as it escapes from the arm on the crank-shaft is returned by the force of the spring 42 to its former position. This sweep throws the animal which has been killed out of the space in front of the impaling knives or spears, leaving said space free for the entrance of another animal.

Our improved trap, as will be readily understood from the foregoing description, is capable of numerous successive operations with one winding or setting, the number depending upon the capacity of the spring or other driver by means of which the mechanism is actuated. It is thus exceedingly well adapted to be used in places where rats or other vermin abound in large numbers.

Having thus fully described our said invention, what we claim as new, and desire to secure by Letters Patent, is—

1. The combination, in an animal-trap, of a suitable frame, a crank-shaft, a suitable driver connected to and operating to drive said crank-shaft, a disk-like detent also mounted on said shaft, a pivoted pawl adapted to engage with said detent, means for normally holding said pawl into engagement, impaling knives or spears operated by said crank-shaft, a bait-carrying part arranged in front of said knives or spears, and connections running therefrom to the pawl, whereby pressure on said bait-carrying part will operate to disengage the pawl and permit the crank-shaft to be given a single revolution under the impulse of the driver, said pawl being caused to reëngage with said detent and stop the motion of the mechanism at the end of such single revolution, substantially as set forth.

2. The combination, in an animal-trap, of impaling knives or spears, suitable mechanism for driving the same, and a sweep whose path of motion is in front of the knives or spears and which is connected to and operated by the same mechanism, whereby the animal is first impaled and killed, and the carcass then thrown out of the way as the trap resets for subsequent operations, substantially as set forth.

3. The combination, in an animal-trap, of impaling knives or spears, a crank-shaft for reciprocating the same, a motor for giving said crank-shaft a number of revolutions after one preparation, a detent and pawl adapted to stop the motion of said shaft at the end of each revolution, a bait-carrying part, connections from said bait-carrying part to said detent-and-pawl device whereby the latter is caused to operate upon a movement of the former, and a sweep whose path of motion is in front of the knives or spears and which is operated by the crank-shaft, substantially as set forth.

4. The combination, in an animal-trap, of a suitable device for striking and killing the animal, a crank-shaft by which said devices are driven having an arm extending out therefrom, a sweep pivoted to the frame of the trap whose path of movement is in front of the animal-killing devices and which is provided with a projection extending into the path of the arm on the crank-shaft, which is thus enabled to move it in one direction, and a spring connected to said sweep and adapted to move it in the opposite direction, substantially as set forth.

In witness whereof we have hereunto set our hands and seals, at Indianapolis, Indiana, this 26th day of October, A. D. 1901.

ELMER D. VANTYLE. [L. S.]
OMER V. VANTYLE. [L. S.]

Witnesses:
CHESTER BRADFORD,
ALBERT F. ZEARING.